(12) United States Patent
Petiphar

(10) Patent No.: US 11,833,936 B2
(45) Date of Patent: Dec. 5, 2023

(54) SET OF SEATS FOR VEHICLE, VEHICLE EQUIPPED WITH THE SET OF SEATS AND METHOD FOR ARRANGING THE SET OF SEATS

(71) Applicant: FAURECIA Sièges d'Automobile, Nanterre (FR)

(72) Inventor: Pierre-Henri Petiphar, Etampes (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 161 days.

(21) Appl. No.: 17/347,828

(22) Filed: Jun. 15, 2021

(65) Prior Publication Data
US 2021/0387553 A1    Dec. 16, 2021

(30) Foreign Application Priority Data
Jun. 16, 2020 (FR) ...................... 20 06298

(51) Int. Cl.
*B60N 2/20* (2006.01)
*B60N 2/01* (2006.01)

(52) U.S. Cl.
CPC .............. *B60N 2/206* (2013.01); *B60N 2/01* (2013.01)

(58) Field of Classification Search
CPC . B60N 2/01; B60N 2/06; B60N 2/206; B60N 2/065; B60N 2/32; B60N 2/10; B60N 2/12; B60N 2/143; B60N 2/305; B60N 2/3045; B60N 2/3068
USPC ......... 296/65.05, 65.01, 65.06, 65.09, 65.13, 296/65.16, 69, 64; 297/313, 325, 326, 297/336, 354.13
See application file for complete search history.

(56) References Cited

U.S. PATENT DOCUMENTS

| | | | | |
|---|---|---|---|---|
| 3,338,622 A | * | 8/1967 | Bachmann | B60N 2/143 297/344.26 |
| 3,391,960 A | * | 7/1968 | Megargle | B60N 3/002 296/64 |
| 5,702,145 A | * | 12/1997 | Fowler | B60N 2/3093 296/68.1 |
| 5,779,313 A | | 7/1998 | Rohee | |
| 7,303,226 B2 | * | 12/2007 | Bernstein | B60N 2/206 296/24.39 |

(Continued)

FOREIGN PATENT DOCUMENTS

| | | | | |
|---|---|---|---|---|
| EP | 0940288 A2 | 9/1999 | | |
| EP | 1508469 A1 | * 2/2005 | ........... | B60N 2/3013 |

(Continued)

*Primary Examiner* — Dennis H Pedder
*Assistant Examiner* — Kevin P Weldon
(74) *Attorney, Agent, or Firm* — Barnes & Thornburg LLP

(57) ABSTRACT

A set of seats for an automotive vehicle, where the set of seats comprises a first seat and a second seat, where the first seat is provided with a first seatback and a first seat bottom, where the second seat is provided with a second seatback and a second seat bottom, the set of seats is configured in order to have:
  a road configuration in which the first seat bottom extends substantially horizontally and the first seatback extends substantially vertically; and
  a relaxed configuration in which the second seat is in a table position in which the second seatback extends substantially horizontally and the second seat bottom extends substantially vertically, where the second seatback and the second seat bottom delimit a knee space.

19 Claims, 11 Drawing Sheets

(56) References Cited

U.S. PATENT DOCUMENTS

| | | | | |
|---|---|---|---|---|
| 2002/0060481 | A1* | 5/2002 | Jones | B60N 2/206 |
| | | | | 297/188.04 |
| 2007/0158979 | A1* | 7/2007 | Saberan | B60N 2/06 |
| | | | | 297/47 |
| 2009/0302632 | A1* | 12/2009 | Kuno | B60N 2/3065 |
| | | | | 296/65.09 |
| 2010/0123338 | A1* | 5/2010 | Waters | B60N 3/001 |
| | | | | 297/125 |
| 2019/0054848 | A1* | 2/2019 | Vo | B60N 3/004 |
| 2019/0308533 | A1* | 10/2019 | Ewel | B60N 2/6009 |
| 2019/0389335 | A1 | 12/2019 | Epaud | |
| 2020/0101871 | A1 | 4/2020 | Garotte | |
| 2020/0101873 | A1* | 4/2020 | Cluet | B60N 2/3011 |
| 2022/0388466 | A1* | 12/2022 | Jaradi | B60R 21/01554 |
| 2023/0063725 | A1* | 3/2023 | Cho | B60N 3/008 |

FOREIGN PATENT DOCUMENTS

| | | | | | |
|---|---|---|---|---|---|
| EP | 4183622 | | * | 5/2023 | |
| FR | 2740406 | A1 | | 4/1997 | |
| FR | 2881695 | A1 | * | 8/2006 | B60N 2/206 |
| FR | 2890910 | A1 | * | 3/2007 | B60N 2/22 |
| FR | 2892349 | A1 | | 4/2007 | |
| FR | 2902375 | A1 | | 12/2007 | |
| FR | 3082793 | A1 | | 12/2019 | |
| FR | 3086596 | A1 | | 4/2020 | |
| JP | 2002193002 | A | * | 7/2002 | B60N 2/206 |
| JP | 2009292407 | | | 12/2009 | |
| KR | 970036660 | A | * | 9/1997 | |

* cited by examiner

SET OF SEATS FOR VEHICLE, VEHICLE EQUIPPED WITH THE SET OF SEATS AND METHOD FOR ARRANGING THE SET OF SEATS

FIELD OF THE INVENTION

The present disclosure relates to a set of seats for automotive vehicles and the vehicle equipped with the set of seats. The present disclosure also targets a method for arrangement of said set of seats.

RELATED ART

In the automotive domain, in particular, vehicles are more and more designed so as to reproduce living spaces in which the users can do some activities during their trip.

For example, a vehicle seat is known provided with a tray that can fold up onto the rear surface of a seatback of said seat. This tray allows a user seated behind said seat to have a surface on which to work during the travel time. In particular for rear seats with three places, the possibility of folding down the seatback in the center place is also known in order to provide a work surface for the user seated in side places.

This is especially practical when the trip takes a lot of time because of the distance covered or possible congestion. Similarly, it proves useful when the user of the vehicle plans to take breaks during the trip.

Nevertheless, the surface area of the fold-down trays is fairly limited, which makes work with large volume tools, such as portable computers, difficult. Similarly, the use of the center seat as worksurface is impractical for the user seated in the side seats because the user is forced to twist the vertebral column in order to use this worksurface, which is not ergonomic.

BRIEF DESCRIPTION OF THE INVENTION

The aim of the present disclosure is to improve the situation.

For this purpose, according to a first aspect, a set of seats for an automotive vehicle is described, where the set of seats comprises a first seat and a second seat, where the first seat is provided with a first seatback and a first seat bottom, where the second seat is provided with a second seatback and a second seat bottom with the second seat bottom extending between an anterior end and a posterior end, and where said second seat bottom is connected to the second seatback by the posterior end, in which the set of seats is configured in order to have:

a road configuration in which the second seat is in a seated position in which the second seat bottom extends substantially horizontally and the second seatback extends substantially vertically in order to receive a user resting on the second seat bottom and the second seatback; and a relaxed configuration in which the second seat is in a table position in which the second seatback extends substantially horizontally and the second seat bottom extends substantially vertically, where the second seatback and the second seat bottom delimit a knee space placed opposite the first seat, such that the user can sit resting on the first seat bottom and the first seatback and place their knees in said knee space.

Thus, advantageously, in the table position, the second seatback of the second seat may be used as a surface on which to work, which significantly increases the available workspace.

Likewise, since the knee space is placed opposite the first seat, the user may sit on the first seat and use the second seatback as a surface on which to work without needing to adopt a position requiring rotation of the vertebral column.

Even more so, since the knee space is placed opposite the first seat, the user of the first seat may use the second seatback as a surface on which to work while still keeping their back in contact with the seatback, which improves comfort.

According to preferred embodiments, the set of seats comprises one or more of the following features, taken alone or in combination:

at least one among the first seat and the second seat is configured for making a reversibility operation for passing from the road configuration to the relaxed configuration, such that in the road configuration the first seatback and the second seatback are oriented in the same direction and in the relaxed configuration the first seat faces the knee space, where the second seat bottom and the first seatback are substantially face-to-face;

the reversibility operation comprises a rotation around a substantially vertical axis of rotation, of at least one among the first seat and the second seat;

the second seat is located in back relative to the first seat in the road configuration, the first seat is configured for rotating around the substantially vertical axis of rotation between the road configuration and the relaxed configuration, and the rotation around the axis of rotation has a rotational amplitude substantially equal to 180°;

the second seat is located in front relative to the first seat in the road configuration, second seat is configured for rotating around the substantially vertical axis between the road configuration and the relaxed configuration, and the rotation around the axis of rotation has a rotational amplitude substantially equal to 180°.

According to a second aspect, a set of seats for an automotive vehicle is also described, where the set of seats comprises a first seat and a second seat, where the first seat is provided with a first seatback and a first seat bottom, where the second seat is provided with a second seatback and a second seat bottom, with the second seat bottom extending between an anterior end and a posterior end, and where said second seat bottom is connected to the second seatback by the posterior end, in which the second seat is configured for turning around a transverse tilting axis located near the anterior end of the second seat bottom, until the second seatback and the second seat bottom delimit a knee space placed opposite the first seat, such that the user can sit resting on the first seat bottom and the first seatback and place their knees in said knee space.

According to preferred embodiments, according to the first aspect or the second aspect, the set of seats comprises one or more of the following features, taken alone or in combination:

the second seat comprises a locking system, where the locking system comprises a first part connected to the second seat bottom near the posterior end and a second part intended to be connected to a floor, where the locking system is configured for having a released configuration in which the first part is free relative to the second part, and a locked configuration in which the first part is held relative to the second part;

the set of seats further comprises at least one slider comprising a fixed profile and a mobile profile, where the mobile profile is mounted sliding relative to the fixed profile, in which the anterior end of the second seat bottom is mounted rotatably relative to the mobile profile of the at least one slider; and the second seatback is mounted rotatably relative to the second seat bottom, where a hinge mechanism is provided for adjusting the inclination of the second seatback relative to the second seat bottom, and where the articulation mechanism allows keeping the second seatback relative to the second seat bottom in:

- at least one comfort inclination in which the second seatback forms relative to the second seat bottom a first angle included in a range of comfort inclinations, with the range of comfort inclinations extending preferably between 90° and 170°, in particular between 100° and 150°, and/or
- at least one desk inclination in which the second seatback forms a second angle relative to the second seat bottom included in a range of desk inclinations, with the range of desk inclinations extending preferably between 80° and 105°, in particular between 85° and 100°.

According to a complementary aspect, a vehicle is described comprising, in addition to the set of seats mentioned above, a floor.

According to another aspect, a method for arrangement of a set of seats for an automotive vehicle is described, where the set of seats comprises a first seat and a second seat, where the first seat is provided with a first seatback and a first seat bottom, where the second seat is provided with a second seatback and a second seat bottom with the second seat bottom extending between an anterior end and a posterior end, and where said second seat bottom is connected to the second seatback by the posterior end, said method comprising the movement of the set of seats between:

- a road configuration in which the second seat is in a seated position in which the second seat bottom extends substantially horizontally and the second seatback extends substantially vertically in order to receive a user resting on the second seat bottom and the second seatback; and
- a relaxed configuration in which the second seat is in a table position in which the second seatback extends substantially horizontally and the second seat bottom extends substantially vertically, where the second seatback and the second seat bottom delimit a knee space placed opposite the first seat, such that the user can sit on the first seat and place their knees in said knee space, where said movement of the set of seats comprises a tilting of the second seat between the seated position and the table position.

According to preferred embodiments, the method comprises one or more of the following features, taken alone or in combination:

the movement of the set of seats between the road configuration and the relaxed configuration further comprises a rotation of at least one among the first seat and the second seat around a substantially vertical axis, where the first seatback and the second seatback are oriented in the same direction in the road configuration and where the second seat bottom and the first seatback are substantially face-to-face in the relaxed configuration; and the movement of the set of seats between the road configuration and the relaxed configuration further comprises bringing the second seat closer to the first seat by translation.

BRIEF DESCRIPTION OF THE DRAWINGS

Other features, details and advantages of the disclosure will appear on reading the following detailed description and analysis of the attached drawings, in which.

DETAILED DESCRIPTION OF VARIOUS EMBODIMENTS

Figure 1:
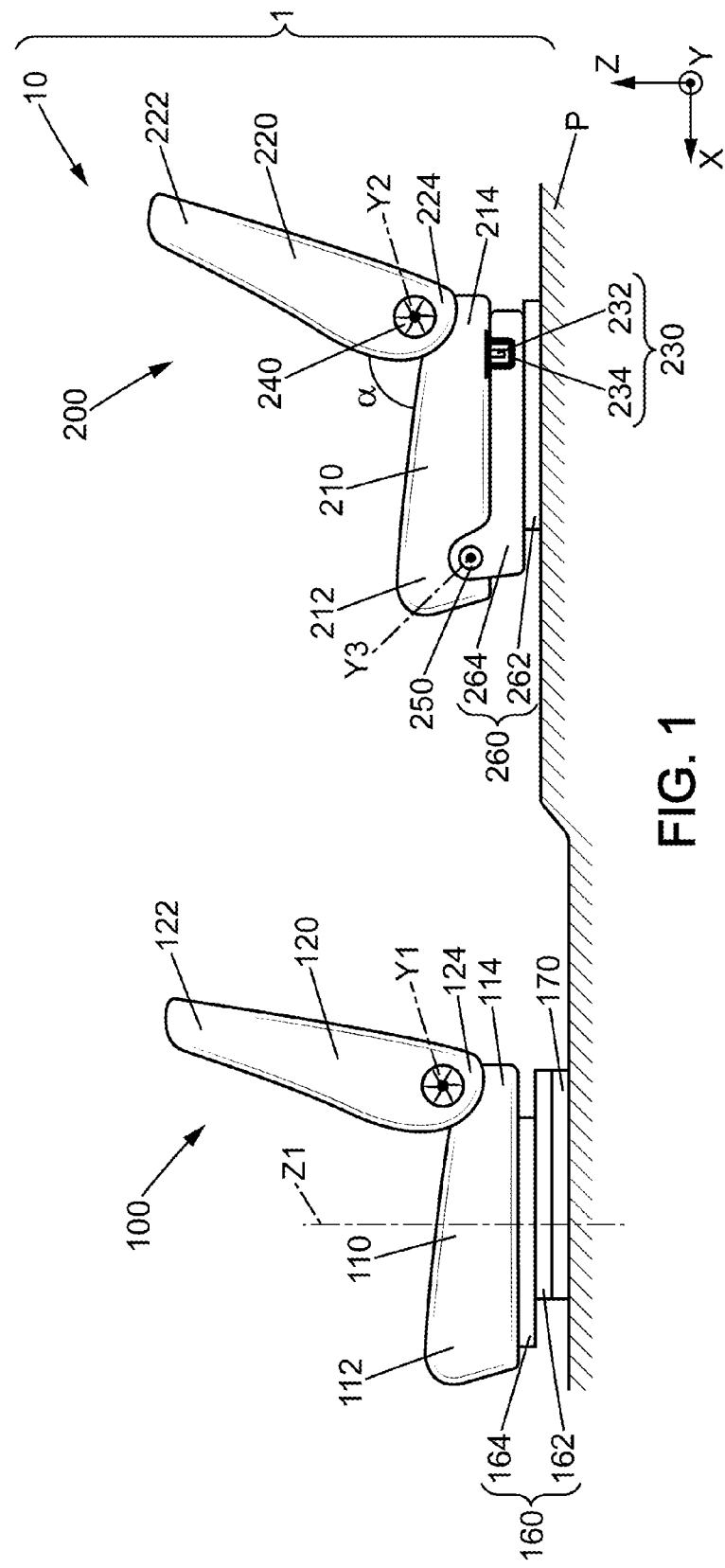
FIG. 1 shows a schematic side view of a set of seats mounted in an automotive vehicle according to a first implementation example from the present disclosure, in a first configuration.

In the various figures, the same references designate identical or similar elements.

In the following description, the indications of spatial positioning such as up, down, upper, lower, horizontal, vertical, etc. are given for clarity of the disclosure, based on the usual position of use of each of the seats of the set of seats, but are not limiting. More specifically, the orientations relative to the front and the rear of the seat are relative to the usual position of use of the seat.

The term "seat" in the present description may refer to a seat intended to receive a single person, when it involves an individual seat, for example arranged in the front of the vehicle. The term "seat" may also refer to a seat that is a part of a bench which could receive several people when it involves for example a rear vehicle bench. Thus, in the meaning of the disclosure, the term "seat" designates equally well an individual seat, a part of a bench, and the bench itself. Similarly, the disclosure may be implemented for seats intended for any type of vehicle and in particular for automotive vehicles.

The example implementations show an automotive vehicle 1 comprising a floor P, a passenger compartment and a set of seats 10 arranged in the compartment and connected to the floor P of the vehicle. Preferably, the floor P comprises a raised part.

The set of seats 10 comprises a plurality of seats. The set of seats 10 comprises a first seat 100 and a second seat 200. The first seat 100 is part of a first row of seats (such as shown in FIGS. 4, 8 and 9). The second seat 200 is part of a second row of seats (such as shown in FIGS. 4, 8 and 9). The first and second rows each extend along a transverse direction Y of the vehicle. The second row of seats is offset relative to the first row of seats along the longitudinal direction X of the vehicle. In the examples of implementation from FIGS. 1 to 9, the first seat 100 is located longitudinally in front relative to the second seat 200. In the implementation example from FIGS. 10 and 11, the first seat 100 is located longitudinally behind relative to the second seat 200. Preferably, the seat located longitudinally behind is installed on a raised part of the floor P.

The longitudinal direction X of the vehicle corresponds to the direction of forward motion of the vehicle. The longitudinal direction is substantially horizontal, preferably horizontal, when the vehicle rests on horizontal ground.

The transverse direction Y of the vehicle corresponds to a direction particular to the direction of forward motion of the vehicle. The transverse direction Y is substantially horizontal, preferably horizontal.

The longitudinal direction X and the transverse direction Y are perpendicular to a vertical direction Z of the vehicle.

The set of seats 10 is intended to receive a user (a driver or passenger) of the vehicle.

The first seat 100 comprises a first seat bottom 110 and a first seatback 120. The first seat bottom 110 extends between an anterior end 112 and a posterior end 114. The first seatback 120 extends between an upper end 122 and a lower end 124.

The first seat bottom 110 is connected to the first seatback 120. In particular, the lower end 124 of the first seatback 120 is connected to the posterior end 114 of the first seat bottom 110. Preferably, the first seatback 120 is mounted rotating relative to the first seat bottom 110 around a substantially transverse axis of articulation Y1.

The second seat 200 comprises a second seat bottom 210 and a second seatback 220. The second seat bottom 210 extends between an anterior end 212 and a posterior end 214. The second seatback 220 extends between an upper end 222 and the lower end 224.

The second seat bottom 210 is connected to the second seatback 220. In particular, the lower end 224 of the second seatback 220 is connected to the posterior end 214 of the second seat bottom 210. Preferably, the second seatback 220 is mounted rotating relative to the second seat bottom 210 around a substantially transverse axis of articulation Y2.

The vehicle further comprises a first slider 160 and a rotation module 170 which will be described subsequently.

Now, the set of seats 10 will be described, along with the first seat 100 and the second seat 200 with reference to a first implementation example shown by FIGS. 1 to 5.

FIG. 1 shows the set of seats 10 in a first configuration which constitutes an ordinary driving configuration, called "road configuration." In the road configuration, the first and second seats 100, 200 are in an ordinary position of use called seated position.

In the seated position, the first seat bottom 110 extends substantially horizontally between the anterior end 112 and the posterior end 114. In the seated position, the first seatback 120 extends substantially vertically between the upper end 122 and the lower end 124. Further, in the seated position, the axis of articulation Y1 is substantially parallel to the transverse direction Y.

Analogously, in the seated position, the second seat bottom 210 extends substantially longitudinally between the anterior end 212 and the posterior end 214. In the seated position, the second seatback 220 extends substantially vertically between the upper end 222 and the lower end 224. In the seated position, the axis of articulation Y2 is substantially parallel to the transverse direction Y. In the first implementation example, the axis of articulation Y2 is substantially parallel to the transverse direction Y in the various configurations in the set of seats 10.

Thus, in the seated position, a user of the first seat 100 may be received with the legs resting on the first seat bottom 110 and the back resting on the first seatback 120. Similarly, in the seated position, a user the second seat 200 may be received resting on the second seat bottom 210 and the back resting on the second seatback 220.

Further, as shown in FIG. 1, in the road configuration the first and second seats 100, 200 are turned in a single direction. In particular, in the road configuration the first and second seats 100, 200 are oriented in a direction of forward motion of the vehicle.

The first seat 100 is mounted on the first slider 160 and on the rotation module 170. The second seat 200 is mounted on a second slider 260. More specifically, the set of seats preferably comprises a pair of identical first sliders 160 and a pair of identical second sliders 260. In the remainder of the detailed description, reference will only be made to a single slider from the pair of first sliders 160 and a single slider from the pair of second sliders 260.

In the road configuration, the first slider 160 and the second slider 260 extend along the longitudinal direction X.

Each of the first slider 160 and second slider 260 comprises a fixed profile 162, 262 and a mobile profile 164, 264. The fixed profile 162, 262 is connected to the floor P of the vehicle. In particular the fixed profile 162 of the first slider 160 is connected to the floor P via the rotation module 170, while the fixed profile 262 is directly connected to the floor P. Alternatively, according to another implementation variant not shown, the fixed profile 262 is immersed in the floor P such that the slider 260 is concealed.

The mobile profiles 164, 264 are connected, respectively, to the fixed profiles 162, 262. In particular, the mobile profile 164 is mounted sliding relative to the fixed profile 162. The mobile profile 164 slides relative to the fixed profile 162 along a direction of extension of the first slider 160. In the road configuration in particular, the mobile profile 164 slides relative to the fixed profile 162 along the longitudinal direction X. Similarly, the mobile profile 264 is mounted sliding relative to the fixed profile 262. The mobile profile 264 slides relative to the fixed profile 262 along a direction of extension of the second slider 260. In the road configuration in particular, the mobile profile 264 slides relative to the fixed profile 262 along the longitudinal direction X.

The sliding of the mobile profiles 164, 264 relative to the fixed profiles 162, 262 may be commanded by mechanical means or by electrical means. For example, the sliding of the mobile profiles 164, 264 relative to the fixed profiles 162, 262 is commanded by a rotating command rod, named pedal, placed on the first and second seats 100, 200 or by an electrical command means.

Advantageously, the first and second seats 100, 200 are connected to the mobile profiles 164, 264, respectively. Preferably, the seat 100 is connected to the mobile profile 164 by the first seat bottom 110 and the seat 200 is connected to the mobile profile 264 by the second seat bottom 210.

In that way, when the mobile profile 164 slides relative to the fixed profile 162, the first seat 100 is moved in translation along the direction of extension of the first slider 160. Analogously, when the mobile profile 264 slides relative to the fixed profile 262, the second seat 200 is moved in translation along the direction of extension of the second slider 260.

The rotation module 170 is connected to the floor P and positioned below the first slider 160 (between the first slider 160 and the floor P). The rotation module 170 comprises for example a turning ring connected to the first slider 160. In particular, the turning ring is connected to the fixed profile 162 of the first slider 160.

The turning ring of the rotation module 170 is configured for rotating around a substantially vertical axis of rotation Z1, where the axis of rotation Z1 is substantially parallel to the vertical direction Z. Preferably, the rotation of the turning ring has an amplitude included between 0° and 360°. Advantageously, the rotation of the turning ring may have all the rotation amplitude values included between 0° and 360°. Advantageously, the rotation of the turning ring may have only certain discrete rotation amplitude values included between 0° and 360°. For example, the rotation of the turning ring could have only rotation amplitude values that are multiples of 15°.

Preferably, the rotation module 170 is electrically commanded. In that way, the adjustment of the rotation of the turning ring is done by means of command buttons of the rotation module 170. To do that, the rotation module 170 may for example comprise a drive motor (not shown). The drive motor may then be commanded by means of command buttons.

The rotation module 170 serves to rotate the first seat 100 around the axis of rotation Z1 with a rotational amplitude included between 0° and 360°. In particular, the rotational amplitude of the rotation of the first seat 100 is equal to the rotational amplitude of the rotation of the turning ring.

Similarly, the first slider 160 is rotated around the axis of rotation Z1 with a rotational amplitude included between 0° and 360°. In particular, the rotational amplitude of the first slider 160 is equal to the rotational amplitude of the rotation of the turning ring. An orientation of the first slider 160 therefore varies when the first seat 100 is rotated around the substantially vertical axis Z1.

According to an alternative not shown, the rotation module 170 may be positioned above the first slider 160 (between the first slider 160 and the first seat 100). In this alternative, the rotation module advantageously comprises a fixed structure and the turning ring.

The fixed structure is connected to the first slider 160 and does not rotate around the axis Z1 at all when the first seat 100 is rotated. Thus, the first slider 160 does not change orientation when the first seat 100 is rotated by the rotation module 170.

The turning ring is connected to the first seat bottom 110 such that the rotation of the turning ring around the rotation axis Z1 rotates the first seat 100.

An example of such a rotation module is given for example in the document FR-A-3 086 596.

The second seat 200 comprises a locking system 230, an articulation mechanism 240 and a tilting mechanism 250.

The locking system 230 is placed at the posterior end 214 of the second seat bottom 210. As is particularly shown on FIGS. 1 and 2, the locking system 230 links the second seat 200 to the mobile profile 264 of the second slider 260.

The locking system 230 comprises a first part 232 and a second part 234. The first part 232 comprises a foot extending from a lower surface of the posterior end 214 of the second seat bottom 210. The foot extends substantially perpendicularly to the seat bottom 210. For example, the foot has a substantially cylindrical shape. The foot is associated with a mobile element (not shown).

The second part 234 is intended to be connected to the floor P of the vehicle. In particular, the second part 234 is connected to the floor P via the second slider 260. Advantageously, the second part 234 is included in the mobile profile 264 of the second slider 260.

The second part 234 comprises a body having a shape complementary to the foot of the first part 232, in a way that the foot may be inserted and held in the second part 234.

The foot is in particular shaped in order to be held removably in the second part 234 because of a movement of the mobile element. In that way the locking system 230 is configured for having a released configuration and a locked configuration.

In the released configuration, the first part 232 is released relative to the second part 234. In the locked configuration, the first part 232 is held relative to the second part 234.

The change from the locked configuration to the released position of the locking system 230 may be commanded by mechanical means or electrical means.

The locking system 230 serves to secure the seat bottom 210 of the second seat 200 to the mobile profile 264 of the second slider 260.

Figure 5:
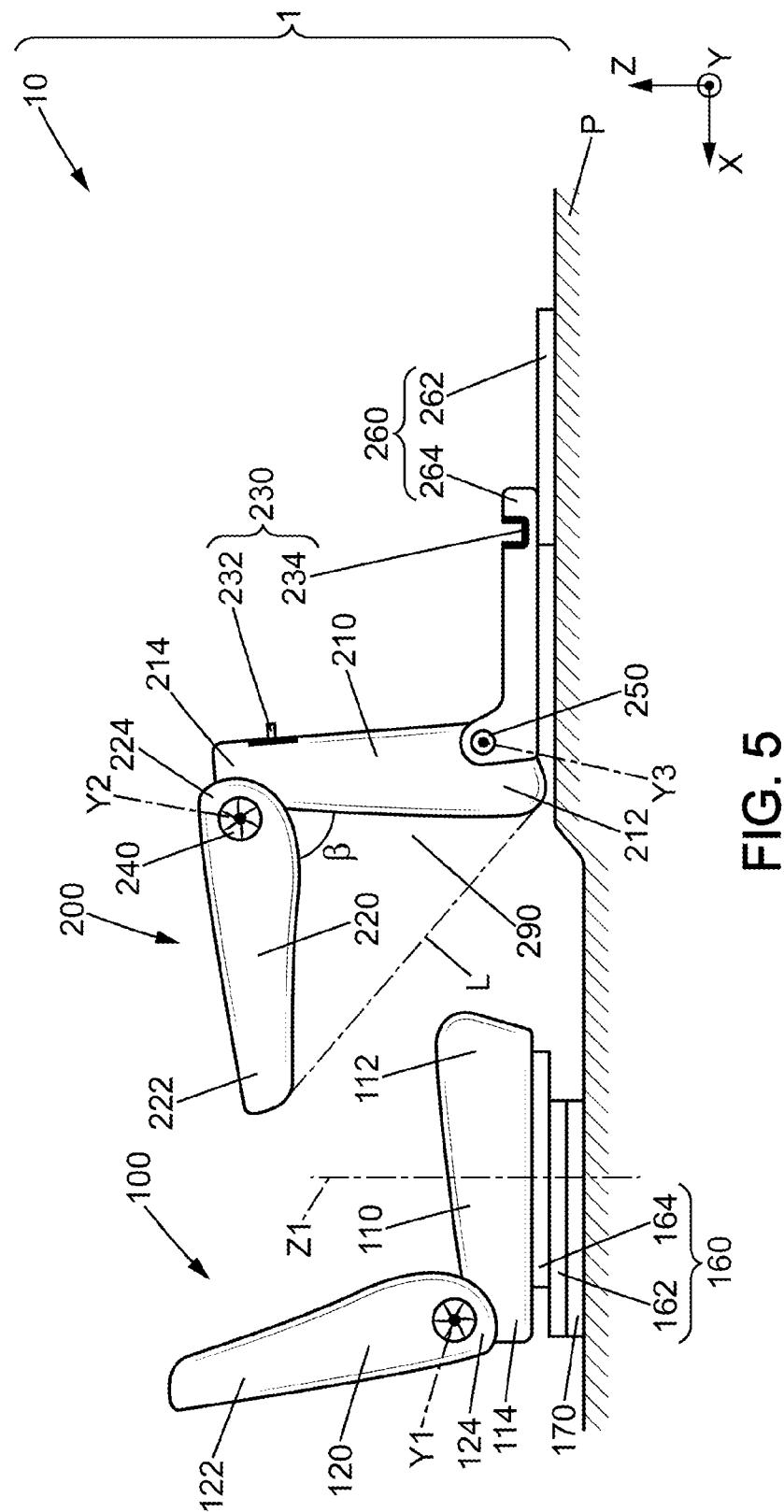
FIG. 5 shows a side schematic view of the set of seats from FIG. 1, in a fifth configuration.

A similar example of such a locking system 230 is given in the document FR-A-2 892 349, referring in particular to FIG. 5 of that document.

The articulation mechanism 240 is provided between the second seat bottom 210 and the second seatback 220. The articulation mechanism 240, well known in itself, is commanded by a command member, not shown. The command member is for example a rotating handle, or an electric command means.

Examples of such articulation mechanisms 240 are described for example in the document FR-A-2 740 406 or the document FR-A-3 082 793, which can be consulted for a more complete description.

With the articulation mechanism, an inclination of the second seatback 220 relative to the second seat bottom 210 can be adjusted. In particular, the articulation mechanism 240 is suitable for holding the second seatback 220 relative to the second seat bottom 210 in at least one comfort inclination.

In the comfort inclination, the second seatback 220 forms, relative to the second seat bottom 210, an angle α (shown in FIG. 1) included in a range of comfort inclinations extending preferably between 90° and 170°, in particular between 100° and 150°.

The articulation mechanism 240 is further suitable for holding the second seatback 220 relative to the second seat bottom 210 in at least one desk inclination.

Figure 2:
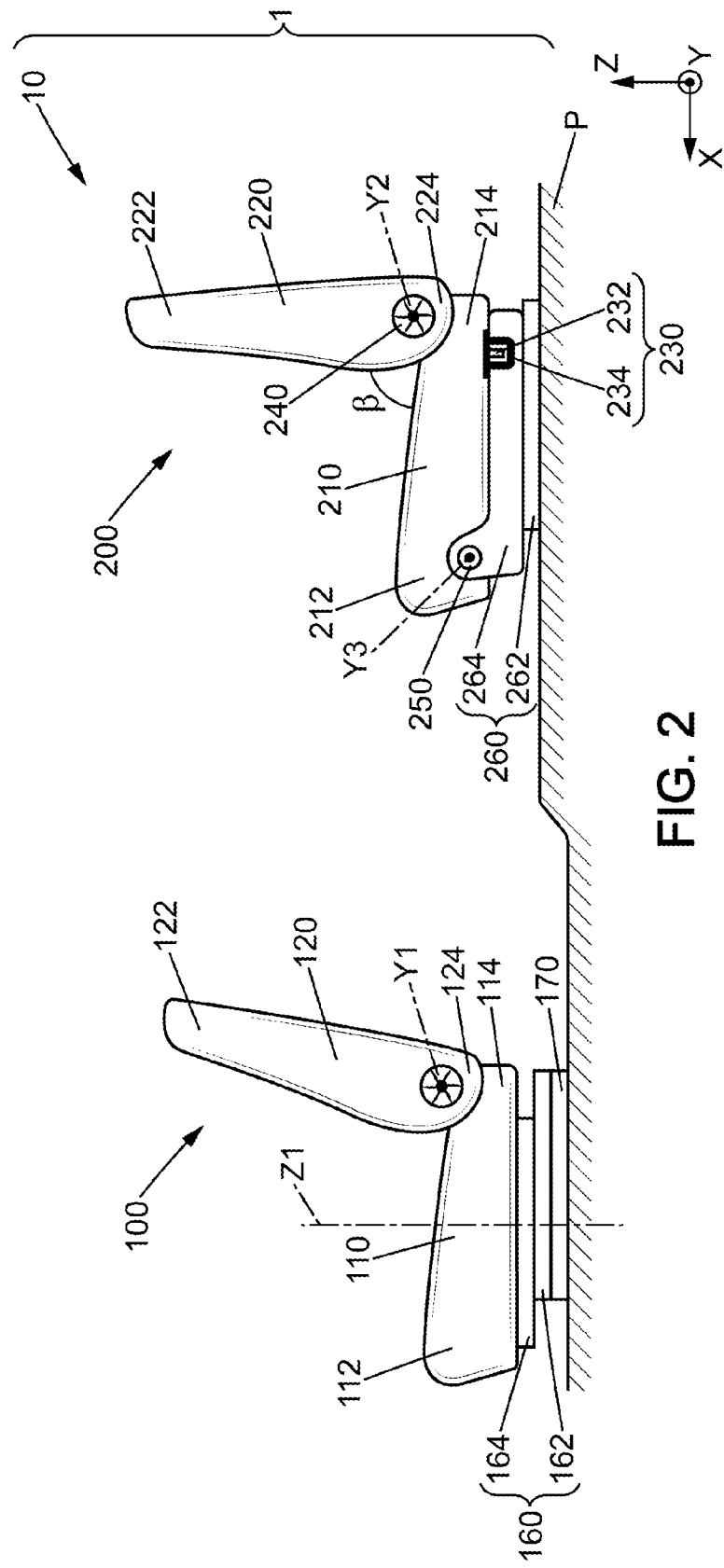
FIG. 2 shows a side schematic view of the set of seats from FIG. 1, in a second configuration.

In the desk inclination, the second seatback 220 forms, relative to the second seat bottom 210, an angle β included in a range of desk inclinations extending between 80° and 105°, preferably between 85° and 100°. The FIG. 2 shows the second seatback 220 in one of the desk inclinations.

The tilting mechanism 250 preferably comprises at least one articulation and at least one optional stop (not shown).

The articulation may be an articulation of the type called discontinuous, such as described in the document FR-A-2 740 406 or of the type called continuous such as described in the document FR-A-2 902 375. Advantageously the articulation comprises mechanical means (not shown) arranged so as to connect the anterior end 212 of the second seat bottom 210 to the mobile profile 264 of the second slider 260. For example, the mechanical means are a rotating shaft passing through the second seat bottom 210 from the mobile profile 264. In the first implementation example, the axis of articulation Y2 is substantially parallel to the transverse direction Y in the various configurations in the set of seats 10. As a variant, the mechanical means could comprise a system of rods connected between the anterior end 212 and the mobile profile 264. The tilting axis Y3 would then be mobile relative to the seat bottom 210 during the tilting motion of the seat 200. The tilting mechanism 250 may be commanded by mechanical means or by electrical means. For example, the tilting mechanism 250 is activated when the user exerts a force on the handle provided on the second seat 200. Alternatively, the tilting means 250 is activated from the actuation of an electric command means associated with the second seat 200.

The tilting mechanism 250 allows a rotation of the second seat 200 around the substantially transverse tilting axis Y3. In the road configuration, the tilting axis Y3 is substantially parallel to the transverse direction Y. The tilting axis Y3 is located near the anterior end 212 of the second seat bottom 210. Thus, the second seat bottom 210 is mounted rotating relative to the mobile profile 264 of the second slider 260. More precisely, the anterior end 212 is connected to the mobile profile 264 rotatably around the tilting axis Y3.

In particular, the articulation of the tilting mechanism 250 guides the second seat 200 in rotation around the tilting axis Y3. Preferably, the articulation locks in position so that the second seat bottom 210 can be immobilized in a preferred position. As a variant, it could be provided that the tilting mechanism only fulfills the function of guiding the second seat 200 in rotation around the tilting axis Y3, and that a distinct mechanism serves to immobilize the second seat bottom 210 in the preferred position. Thus, the second seat 200 is configured for turning around the tilting axis Y3.

Figure 3:
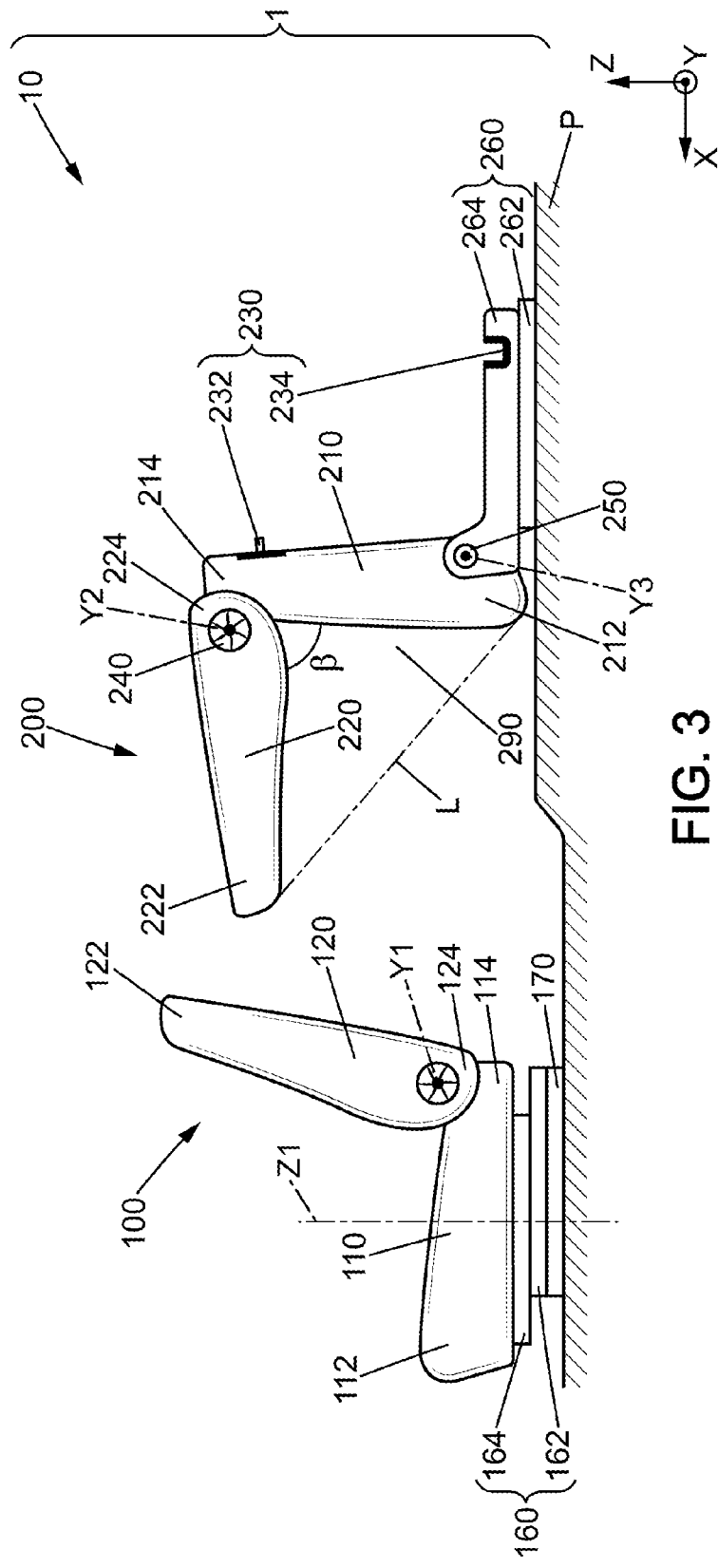
FIG. 3 shows a side schematic view of the set of seats from FIG. 1, in a third configuration.
Figure 4:
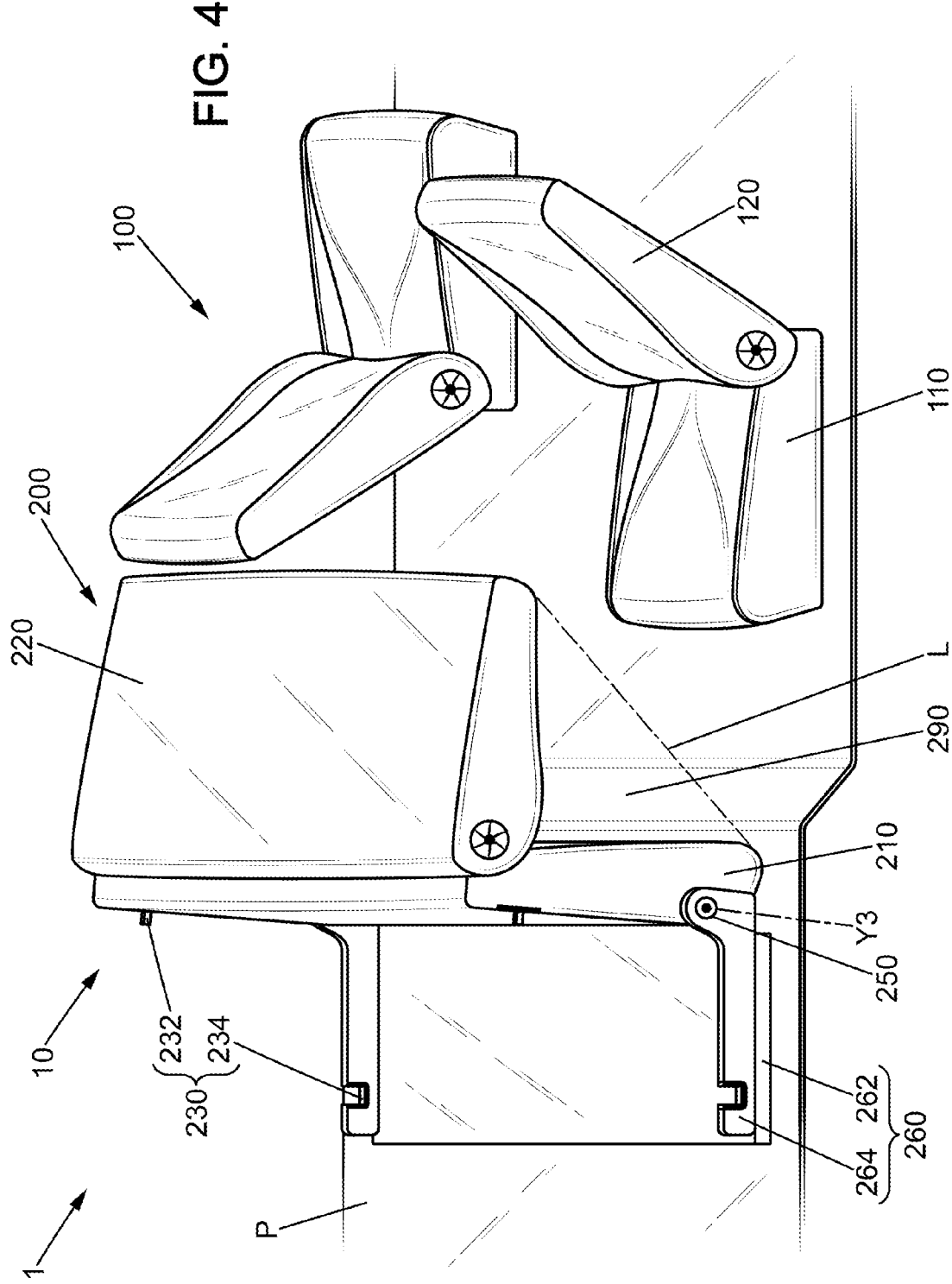
FIG. 4 shows a perspective schematic view of the set of seats from FIG. 1, in a fourth configuration.

Advantageously, as particularly shown in FIGS. 3 to 5, the rotation of the second seat 200 around the tilting axis Y3, serves to move the second seat 200 between the seated position and a table position. The table position is shown in particular in FIGS. 3 to 5. In the table position, the second seat bottom 210 extends substantially vertically and the second seatback 220 extends substantially horizontally. The stop of the tilting mechanism 250 prevents the second seat bottom 210 from tilting well beyond the vertical direction Z, in order to help the user in tilting the second seat 200 into table position.

In order to change the second seat 200 from the seated position to the table position, the locking system 230 needs to be in the released position. When the locking system 230 is in the locked position, changing the second seat 200 from the seated position to the table position is prevented.

Preferably, when the second seat 210 is in the table position, the second seatback 220 is held by the hinge mechanism 240 in one of the desk inclinations relative to the second seat bottom 210.

As clearly shown in FIGS. 3 to 5, in the table position of the second seat 200, the second seatback 220 and the second seat bottom 210 delimit a knee space 290.

The knee space 290 is delimited by a triangle formed by the second seat bottom 210, the second seatback 220 and an imaginary line L, shown in FIGS. 3 to 5. The imaginary line L connects the upper end 222 of the second seatback 220 and the anterior end 212 of the second seat bottom 210.

As detailed below, the knee space 290 allows a user seated in the first seat 100 to place their knees in said knee space 290.

Advantageously, because the anterior end 212 of the first seat bottom 210 is connected to the mobile profile 264 of the second slider 260, the second seat 200 may be moved in translation in the direction and the orientation of sliding of the mobile profile 264 even when the second seat 200 is in the table position.

Because of the joint action of the rotation mechanism 170, of the locking system 230, of the articulation mechanism 240, and of the tilting mechanism 250, the set of seats 10 can adopt a fifth configuration called "relaxed configuration." The relaxed configuration is shown in particular in FIG. 5.

In the relaxed configuration, the set of seats 10 is positioned so as to bring the appearance of the passenger compartment of the vehicle closer to a living area.

In particular in the relaxed configuration, the second seat 200 is in a table position. Further, as clearly shown in FIGS. 4 and 5, in the relaxed configuration the first and second seats 100, 200 are oriented in opposite directions, more precisely face-to-face. In particular for the change from the road configuration to the relaxed configuration, the rotation module 170 rotates the first seat 100 around the axis of rotation Z1 with the rotation having a rotational amplitude substantially equal to 180°.

Thus, in the relaxed configuration the first seat 100 is oriented so as to be facing the second seat 200. The first seat 100 is therefore facing the knee space 290 delimited by the second seatback 220 and the second seat bottom 210.

The first seat 100 may be brought closer to the knee space 290 when the second seat 200 is in the table position. Thus, in the relaxed configuration, the second seatback 220 and the first seat bottom 110 are substantially face-to-face. In particular, in the first implementation example shown, the second slider 260 can be commanded in such a way that the mobile profile 264 slides along the longitudinal direction X towards the first seat 100. As a variant, bringing the first seat 100 and the knee space 290 closer could be done (additionally or alternatively) based on a command for sliding of the mobile profile 164 of the first slider 160. In this variant, the mobile profile 164 of the first slider 160 would slide along the longitudinal direction X towards the second seat 200.

Now, a method for arranging the set of seats described above will be described with reference to the implementation example from FIGS. 1 to 5. The method allows the movement of the set of seats 10 between the road configuration and the relaxed configuration.

In the implementation example from FIGS. 1 to 5, only the second seat 200 can be tilted from the seated position to the table position.

As shown in FIG. 1 in a first step, the seat assembly 10 is located in the road configuration. In the road configuration the first and second seats 100, 200 are oriented in the same direction. Further, the first and second seats 100, 200 are located in the seated position. Optionally, the first and second seatbacks 120, 220 are found in the comfort inclination. The locking system 230 for the second seat 200 is in the locked configuration.

Next, as shown in FIG. 2, the second seatback 220 of the second seat 200 is moved to a desk inclination using a command for the articulation mechanism 240.

The locking system 230 for the second seat 200 is then commanded to go from the locked configuration to the released configuration. Thus, a tilting of the second seat 200 between the seated position and the table position may be done. The knee space 290 is then formed such as shown in FIG. 3.

Alternatively, the tilting of the second seat 200 between the seated position and the table position can be done before the second seatback 220 is in the desk inclination. The articulation mechanism 240 will therefore be commanded after tilting from the seated position to the table position in order to place the second seatback 220 into desk inclination.

Further, the first seat 100 does a reversibility operation because of the action of the rotation module 170. In particular, during the reversibility operation, the rotation module 170 is commanded in order to rotate the first seat 100. In particular, as shown schematically in FIG. 4, the rotation of the first seat 100 caused by the rotation module 170 is substantially equal to 180°. Thus the first seat 100 is located facing the knee space 290, thus allowing the user of the first seat 100 to place their knees in the knee space 290. As shown in FIG. 3, the rotation of the first seat 100 may be commanded after changing the second seat 200 into table position. Alternatively, the rotation of the first seat 100 is commanded before changing the second seat 200 into table position.

According to the preferences of the user, the second seat 200 in table position may be brought closer to the first seat 100 such as shown in FIG. 5. As previously explained, bringing the second seat 200 closer is possible based on the translation of the mobile profile 264 of the second slider 260. In particular, the mobile profile 264 slides relative to the fixed profile 262 along the longitudinal direction X and towards the first seat 100. Alternatively, the first seat 100 may be brought closer to the knee space 290 based on the translation of the mobile profile 164 of the first slider 160.

Now, the set of seats 10 will be described, along with the first seat 100 and the second seat 200 with reference to a second implementation example shown by FIGS. 6 to 7.

As previously specified, in the implementation example from FIGS. 6 to 9, the second seat 200 is also located longitudinally behind the first seat 100.

The implementation example from FIGS. 6 to 9 is distinguished from the implementation example from FIGS. 1 to 5 in that the tilting mechanism 250 of the second seat 200 is placed in front of the second seat 200. Preferably, the tilting mechanism 250 is connected to the fixed profile 262 of the second slider 260. Advantageously, the tilting mechanism 250 is located near an edge of the elevated part of the floor P. The tilting mechanism 250 allows a rotation of the second seat 200 with the second slider 260 around the tilting axis Y3. Thus, the second seat 200 can tilt between the seated position and the table position based on the rotation of the second seat 200 around the tilting axis Y3.

The implementation example from FIGS. 6 to 9 is also distinguished from the implementation example from FIGS. 1 to 5 in that the locking system 230 connects the second seat 200 directly to the floor P.

As clearly shown on FIGS. 6 to 9, the second part 234 of the locking system 230 is directly connected to the floor P. In particular, the second part 234 is included in the floor P. The first part 232 of the locking system 230 is then directly connected to a lower part of the fixed profile 262 of the second slider 260. The remainder of the structural and functional characteristics of the second implementation example shown in FIGS. 6 to 9 are identical with the structural and functional characteristics from the first implementation example from FIGS. 1 to 5 and consequently they will not be described in detail.

Figure 6:
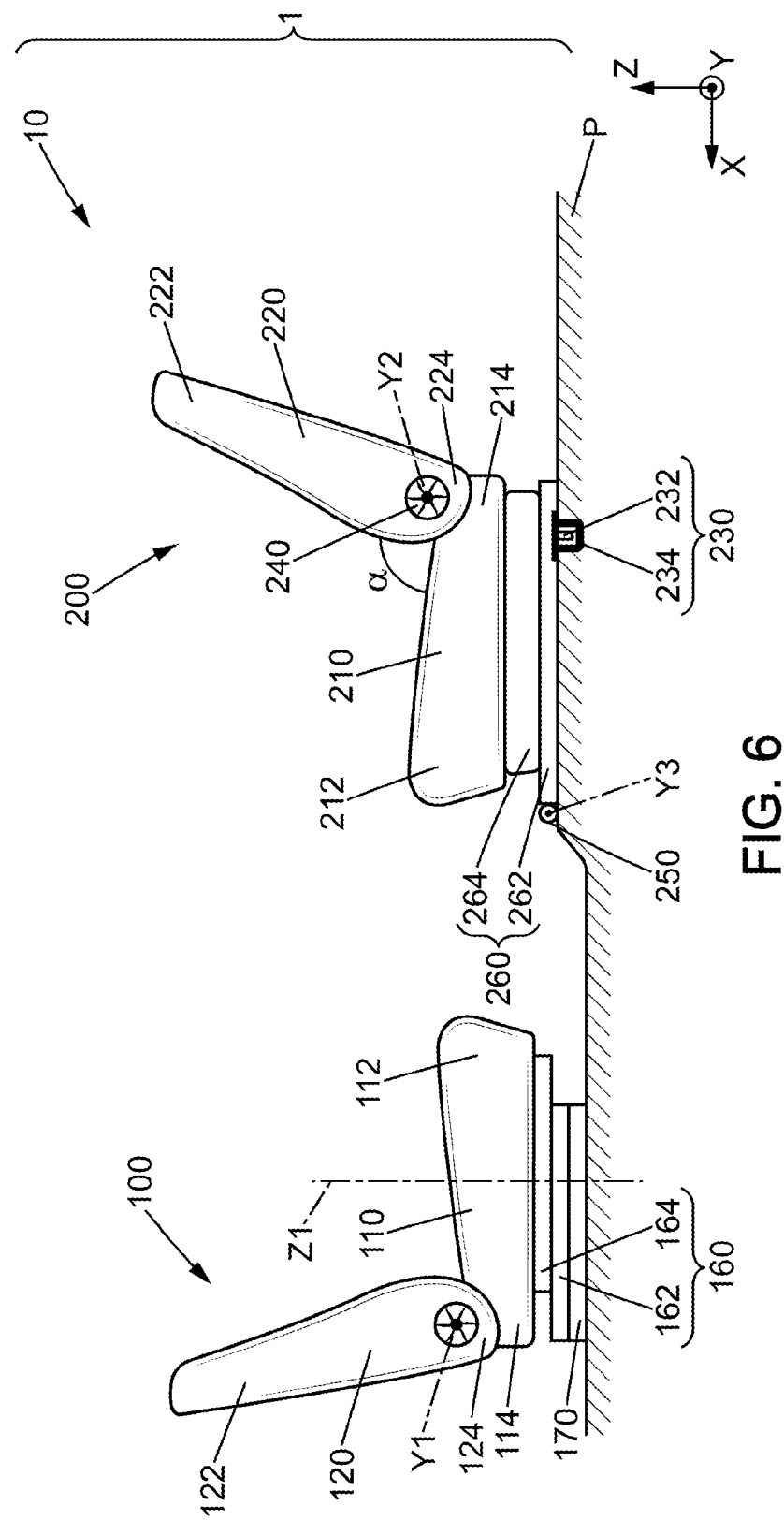
FIG. 6 shows a schematic side view of a set of seats mounted in an automotive vehicle according to a second implementation example from the present disclosure, in an alternative of the third configuration.
Figure 7:
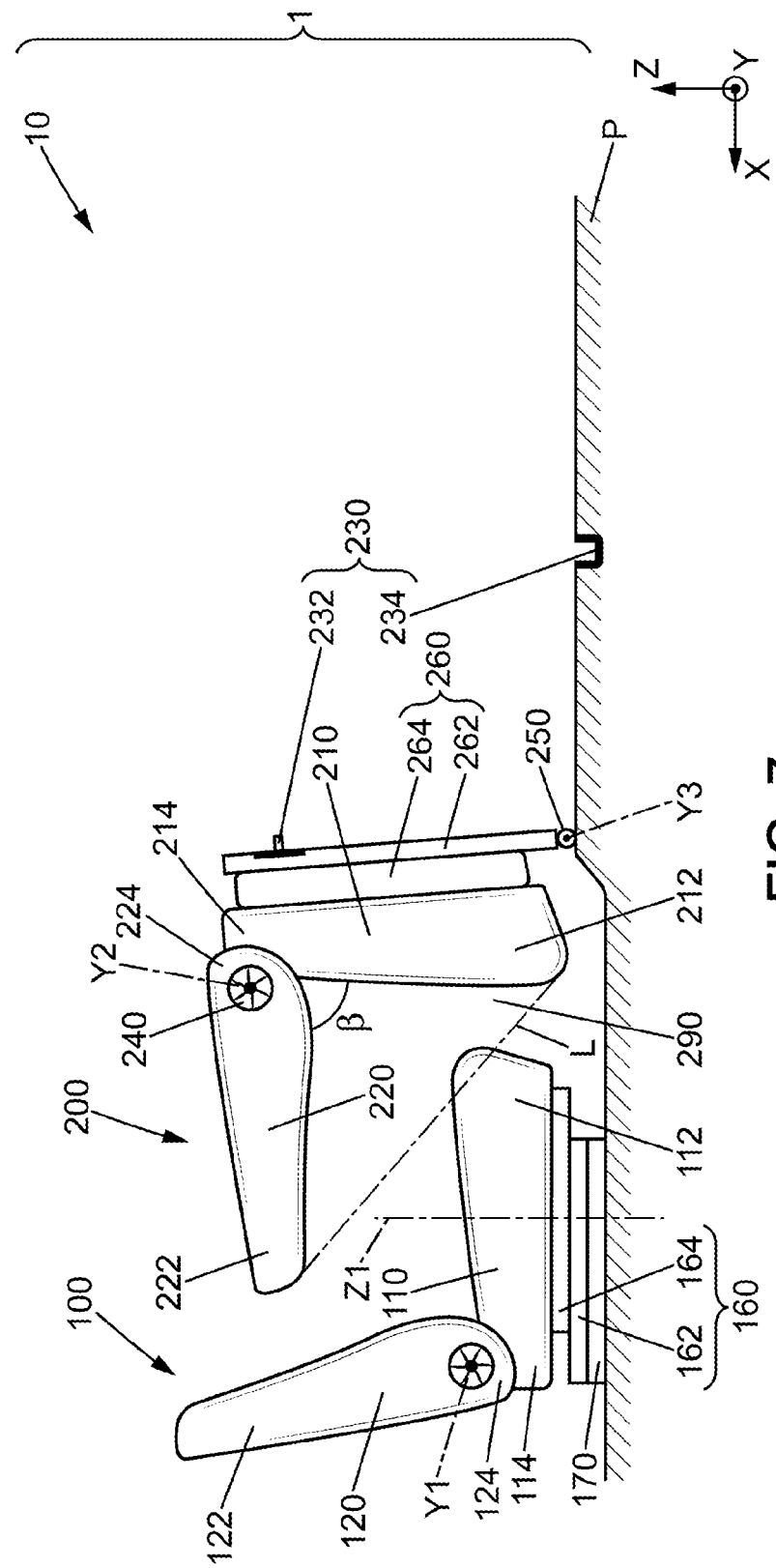
FIG. 7 shows a side schematic view of the set of seats from FIG. 6, in the fifth configuration.
Figure 8:
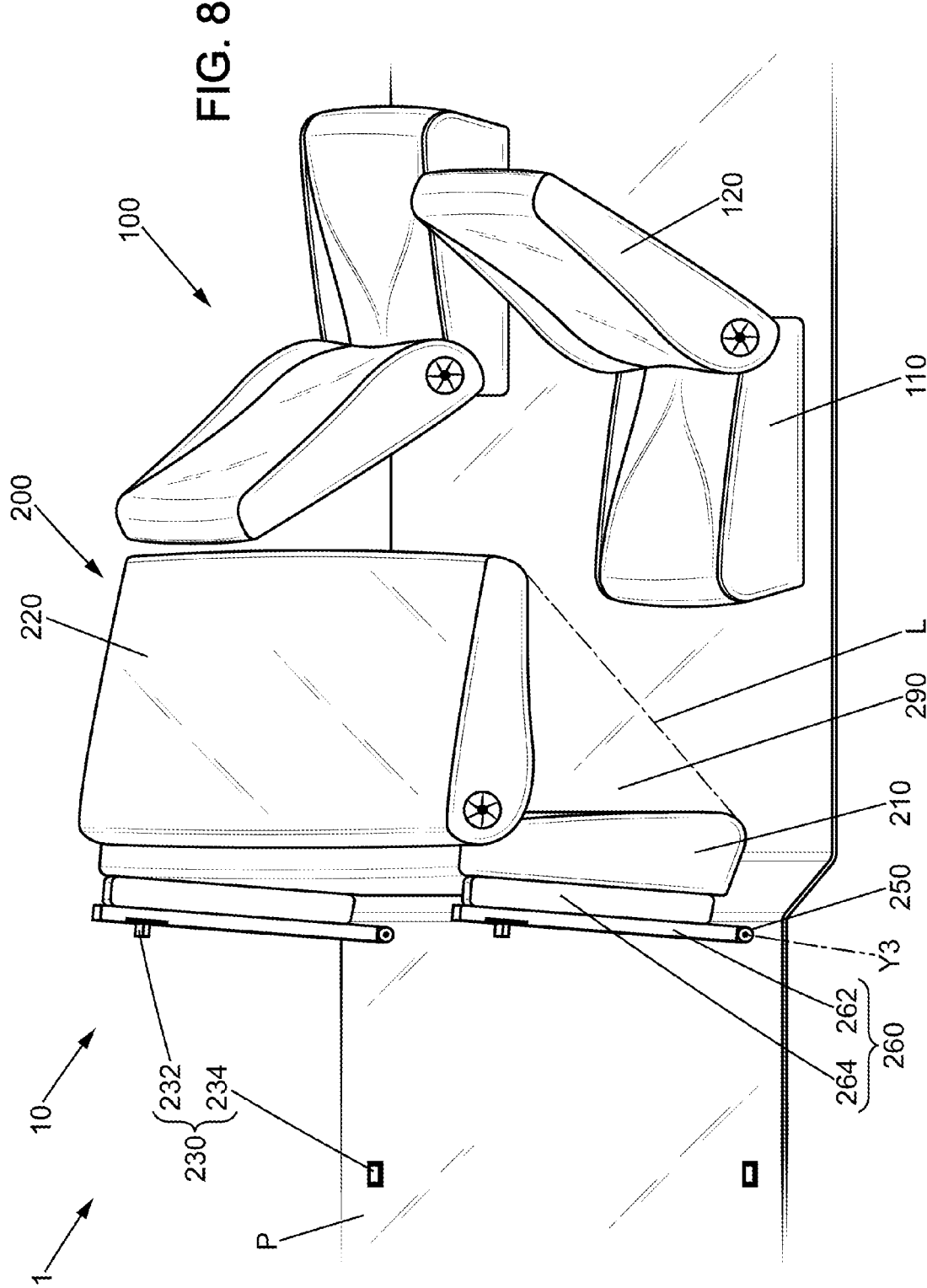
FIG. 8 shows a perspective schematic view of the set of seats from FIG. 6, in the fifth configuration.
Figure 9:
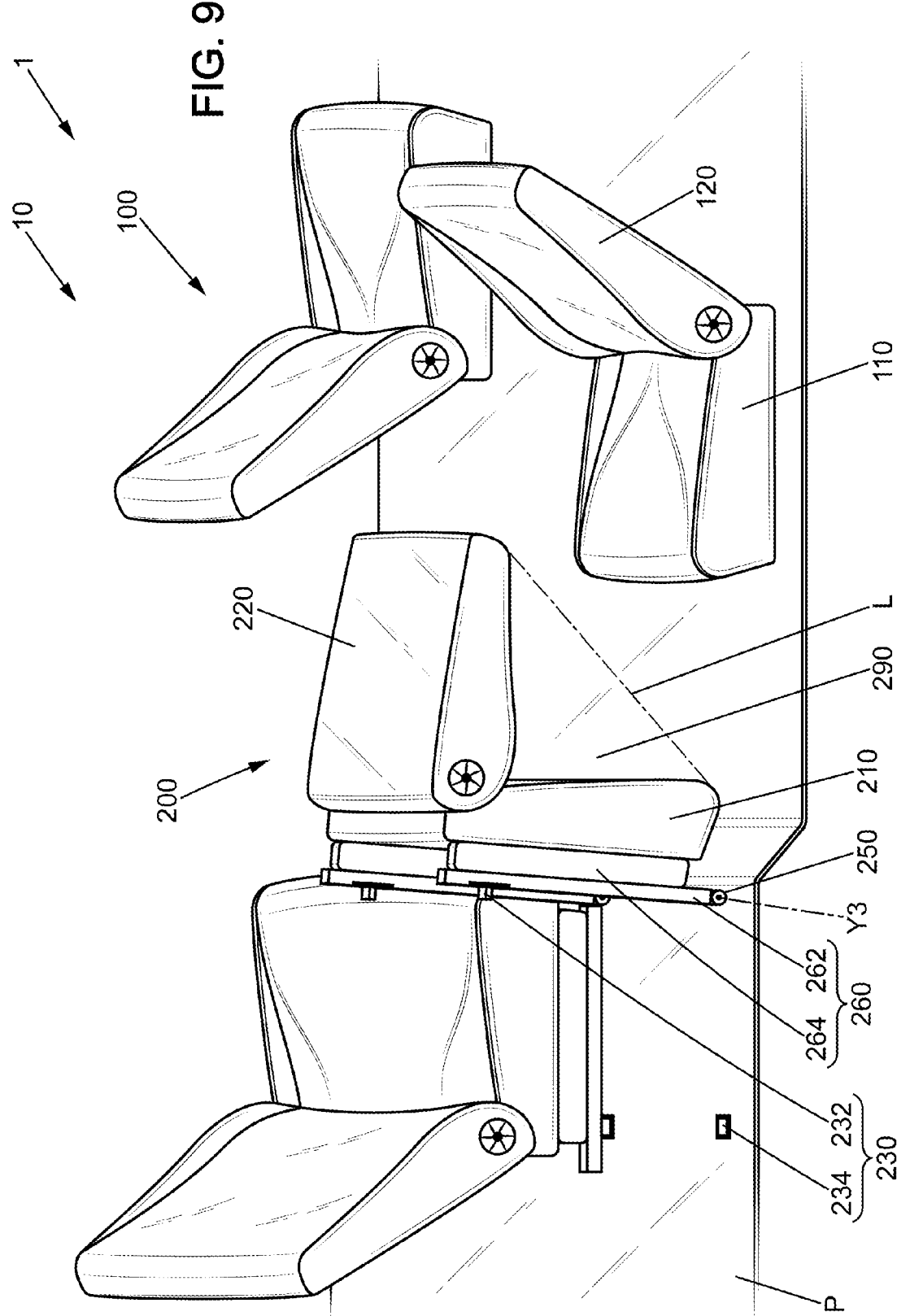
FIG. 9 shows a perspective schematic view of the set of seats from FIG. 6, in the fifth configuration according to a variant of the second implementation example.

The variant of the second implementation example shown in FIG. 9 is distinguished from the second implementation example from FIGS. 6 to 8 in that in the variant of the second implementation example from FIG. 9 the second seat 200 is an individual seat instead of a bench.

Now, a method for arranging the set of seats described above will be described with reference to the implementation example from FIGS. 6 to 9. The method allows the movement of the set of seats 10 between the road configuration and the relaxed configuration.

The method for arranging the set of seats from FIGS. 6 to 9 differs from the method for arranging the set of seats from FIGS. 1 to 5 in that during the change between the seated position and the table position of the second seat 200, the second slider 260 turns together with the second seat 200 around the tilting axis Y3 associated with the tilting mechanism 250.

The method for arranging the set of seats from FIGS. 6 to 9 also differs from the method for arranging the set of seats from FIGS. 1 to 5 in that bringing the second seat 200 in table position closer to the first seat 100 by sliding the mobile profile 264 relative to the fixed profile 262 is prevented. In fact, because the second slider 260 turns together with the second seat 200 around the axis Y3, sliding of the mobile profile 264 relative to the fixed profile 262 is prevented when the second seat 200 is in table position.

The remaining characteristics of the method for arranging the set of seats from FIGS. 6 to 9 are identical to the characteristics of the method for arranging the set of seats from FIGS. 1 to 5. Consequently they will not be described in detail.

Now, the set of seats 10 will be described, along with the first seat 100 and the second seat 200 with reference to a third implementation example shown by FIGS. 10 and 11.

Figure 10:
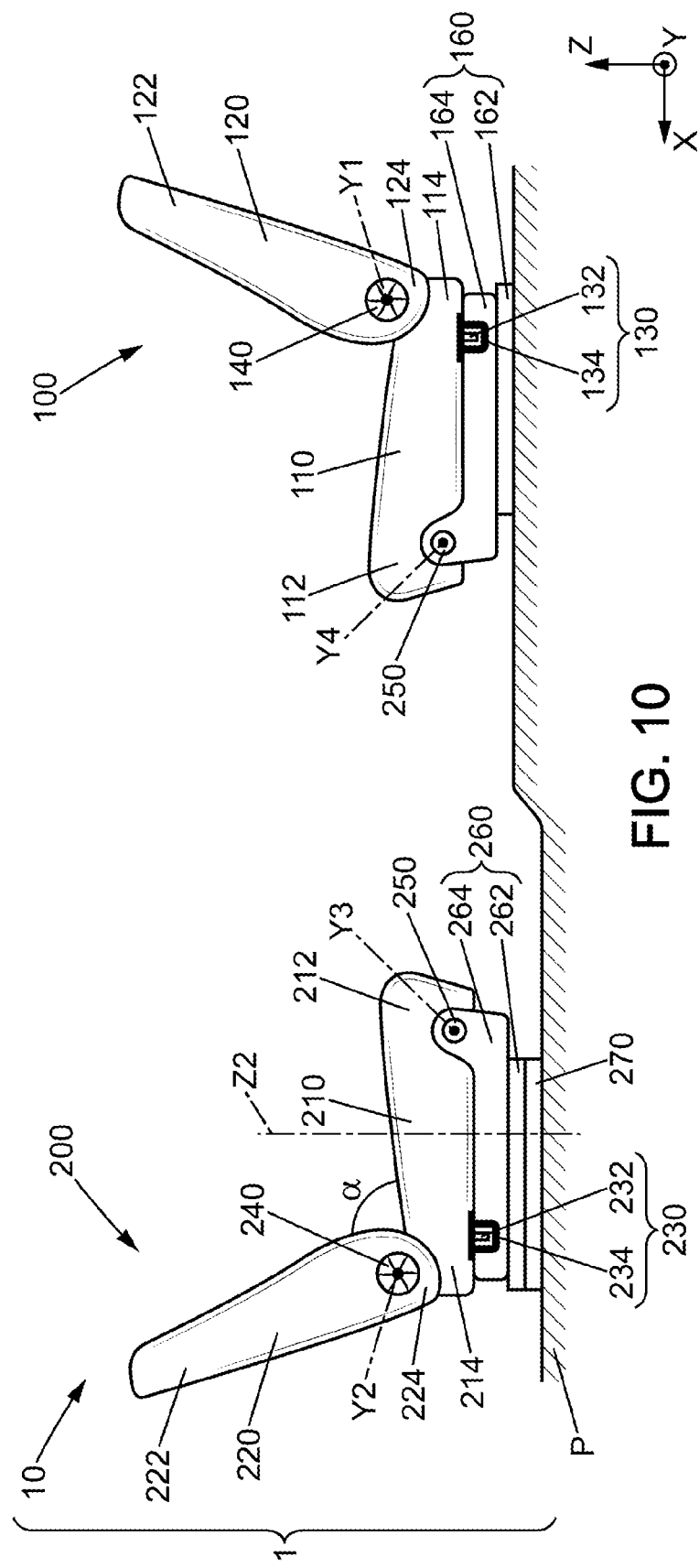
FIG. 10 shows a schematic side view of a set of seats mounted in an automotive vehicle according to a third implementation example from the present disclosure, in another alternative of the third configuration.
Figure 11:
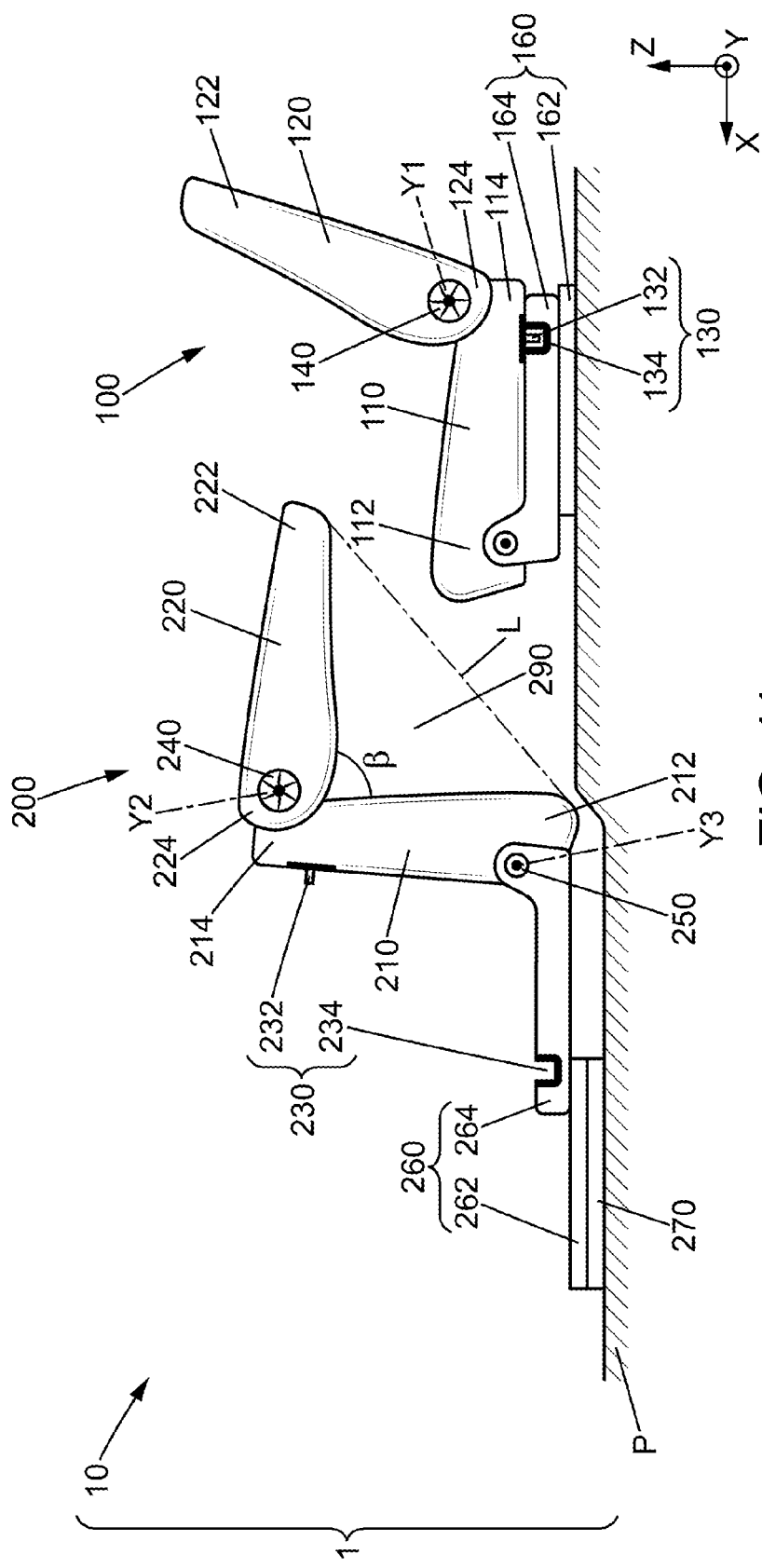
FIG. 11 shows a side schematic view of the set of seats from FIG. 10, in the fifth configuration.

As previously specified, in the implementation example from FIGS. 10 and 11, the second seat 200 is located longitudinally in front of the first seat 100. The implementation example from FIGS. 10 and 11 is distinguished from the implementation example from FIGS. 1 to 5 in that the second seat 200 is mounted on a rotation module 270. In contrast, the first seat 100 is not mounted on the rotation module 170. The rotation module 270 is structurally and functionally identical to the rotation module 170. Consequently, the rotation module 270 will not be described in detail. It will only be explained that, to change from the road configuration to the relaxed configuration, the rotation module 270 rotates the second seat 200 around a substantially vertical axis of rotation Z2 where the axis of rotation Z2 is substantially parallel to the vertical direction Z. Therefore, in the implementation example from FIGS. 10 and 11, the rotating module 270 is commanded in order to rotate the second seat 200. The rotation of the second seat 200 that the rotation module 270 allows has an amplitude of rotation included between 0° and 360°.

The implementation example from FIGS. 10 and 11 is also distinguished, optionally, from the implementation example from FIGS. 1 to 5 in that the first seat 100 further comprises a locking system 130, an articulation mechanism 140 and a tilting mechanism 150. The locking system 130 comprises a first part 132 and a second part 134.

The locking system 130 is structurally and functionally identical to the locking system 230. The articulation mechanism 140 is structurally and functionally identical to the articulation mechanism 240. The tilting mechanism 150 is structurally and functionally identical to the tilting mechanism 250. Consequently, the locking system 130, the hinge mechanism 140 and the tilting mechanism 150 will not be described in detail. It will only be explained that the tilting mechanism 150 allows rotation of the first seat 100 around a substantially transverse axis Y4. The axis Y4 is parallel to the axis Y1. The axis Y4 is located near the anterior end 114 of the first seat bottom 110. Thus, the first seat bottom 110 is mounted rotating relative to the mobile profile 164 of the first slider 160. More precisely, the anterior end 114 is connected to the mobile profile 164 rotatably around the axis Y4. In the first configuration, the access Y4 is substantially parallel to the transverse direction Y.

Thus, in the implementation example from FIGS. 10 and 11, the first seat 100 is also configured for tilting between the seated position and the table position.

In particular the rotation of the first seat 100 around the axis Y4 allows movement of the first seat 100 between the seated position and the table position. Advantageously in the table position, the first seat bottom 110 extends substantially vertically and the first seatback 120 extends substantially horizontally. A knee space (not shown) is thus delimited by a triangle formed by the first seatback 120 and the first seat bottom 110 and an imaginary line (not shown) connecting the upper end 122 of the first seatback 120 and the anterior end 112 of the first seat bottom 110.

The knee space allows a user seated in the second seat 200 to place their knees in said knee space.

Now, a method for arranging the set the seats described above will be described with reference to the implementation example from FIGS. 10 and 11. The method allows the movement of the set of seats 10 between the road configuration and the relaxed configuration.

As previously stated, in the implementation example from FIGS. 10 and 11, the seat tilting between the seated position and the table position is the first seat 100 and optionally the second seat 200.

When the tilting seat enters the seated position and the table position is the second seat 200, the method is different from the method from the implementation example from FIGS. 1 to 5 in that, during the reversibility operation, the first seat 170 is not rotated around the axis of rotation Z1. Likewise, the method is different from the method from the implementation example from FIGS. 1 to 5 in that during the reversibility operation, the rotation module 270 is commanded in order to rotate the second seat 200 around the rotation axis Z2. In particular, as shown schematically in FIG. 11, the rotation of the second seat 200 caused by the rotation module 270 is substantially equal to 180°. Thus the first seat 100 is located facing the knee space 290 so as to allow the user of the first seat 100 to place their knees in the knee space 290.

Preferably, the rotation module 270 rotates the second seat 200 before the tilting mechanism 250 is commanded. Alternatively, the rotation module 270 rotates the second seat 200 after having commanded the tilting mechanism 250.

When the seat tilting between the seated position and the table position is the first seat 100, then the locking system 130 is in the locked position until the tilting of the first seat 100 between the seated position and the table position is commanded.

In the table position of the first seat 100, the first seatback 120 is placed in desk inclination. The articulation mechanism 140 is commanded in order to place the first seatback 120 into the desk inclination. As in the implementation example from FIGS. 1 to 5, the first seatback 120 may be placed in the desk inclination before or after tilting of the first seat 100 between the seated position and the table position.

The second seat 200 is held in seated position, contrary to the implementation example from FIGS. 1 to 5. The second seat 200 is rotated by the rotation module 270. The rotational amplitude is in this case again substantially equal to 180°.

Thus, the second seat 200 is facing the knee space delimited by the triangle formed by the first seat bottom 110, the first seatback 120 and the imaginary line connecting the upper end 122 of the first seatback 120 and the anterior end 112 of the first seat bottom 110. In that way the user of the second seat 200 can place their knees in said knee space.

As with the implementation example from FIGS. 1 to 5, the first seat 100 in table position can be brought closer to the second seat 200 based on a translation of the mobile profile 164 of the first slider 160. In particular, the mobile profile 164 slides relative to the fixed profile 162 along the longitudinal direction X and towards the second seat 200. Alternatively, the second seat 200 may be brought closer to the knee space of the first seat 100 based on the translation of the mobile profile 264 of the second slider 260.

The remainder of the structural and functional characteristics from the third implementation example shown in FIGS. 10 and 11 are identical to the structural and functional features from the first implementation example from FIGS. 1 to 5 whether for the variant in which the seat in table position is the first seat 100 or for the variant in which the seat in table position is the second seat 200. Consequently they will not be described in detail. It should however be noted, as previously specified, that in the third implementation example, the locking system 130, the articulation mechanism 140 and the tilting mechanism 150 are optional. In this alternative, only the second seat 200 is configured for changing from the seated position to the table position.

According to an implementation variant not shown, the first seat 100 and the second seat 200 are part of a single row of seats, where the row extends along the transverse direction Y. In this implementation variant, the first seat 100 is mounted on the rotation module 170 and the second seat 200 is mounted on the rotation module 270. The second seat 200 is configured for changing from the seated position to the table position so as to form the knee space 290. The relaxed configuration is obtained from a rotation substantially equal to 90° of the first seat 100 and of the second seat 200 (in opposite directions in order to bring the seats 100, 200 face-to-face starting from the road configuration) and a change of the second seat 200 into table position. Advantageously, in this implementation variant the second slider 260 is preferably arranged between rotation module 270 and the second seat 200, such that the second slider 260 rotates around the vertical axis Z2 secured relative to the second seat 200. Thus, the second seat 200 may be brought closer to the first seat 100 when the second seat 200 is in the table position. In another variant, the first slider 160 is arranged between the rotation module 170 and the first seat 200, such that the first slider 160 rotates around the vertical axis Z1 secured relative to the first seat 100. The first seat 100 may be brought closer to the second seat 200 when the second seat 200 is in the table position.

Alternatively, in this implementation variant, the relaxed configuration is obtained with the rotation of just the second seat 200 substantially equal to 90°. In this case, after the rotation and the change of the second seat 200 to table position, the second seat 200 is brought closer to the first seat 100 by means of the second slider 260. The first slider 160 serves to adjust the positioning of the second seatback 220 relative to the first seat 100 along the longitudinal direction X, in order to leave room between the first seatback 120 and the second seatback 220 for the body of the user. In this case, the first seat 100 might not be mounted on the rotation module 170.

Of course, the set of seats 10 described above is not limited to the implementation examples disclosed above. For example, the functions of the tilting mechanism 150 and of the locking mechanism 130 could be combined into a single mechanism. Likewise, the functions of the tilting mechanism 250 and of the locking mechanism 230 could you be combined into a single mechanism. Thus, the actuation of the mechanism combining the tilting mechanisms 150, 250 and the locking mechanisms 130, 230 would lead to the changing of the seated position to the table position of seats 100, 200.

Also, as a variant, the second part 134 of the locking system 130 could be arranged on an intermediate part between the floor P and the first seat 100, where the intermediate part is different from the first slider 160. Analogously, the second part 234 of the locking system 230 could be arranged on an intermediate part between the floor P and the second seat 200, where the intermediate part is different from the second slider 260.

Further, the seat bottom and the seatback of the seat located longitudinally in front could be connected by a mechanism allowing said seat to slide along the longitudinal direction X relative to the seatback, in such a way that in a first position, the seat bottom is connected to the seatback at the posterior end, and in a second position, the seat bottom is connected to the seatback at the anterior end. In that way, the reversibility operation would only comprise the sliding of the seat bottom between the first position and the second position without the need to use rotation mechanisms 170, 270.

Similarly, the shape of the seats 100, 200 previously presented is not limiting. For example, the first and second seats 100, 200 could further each comprise at least one armrest, and a headrest, not shown.

Preferably, the headrest is connected to the first seatback 120 and of the second seatback 220 so as to be able to be moved along the vertical direction Z between a low position and a high position. Again preferably, the headrest is connected removably to the first seatback 120 or to the second seatback 220.

For example, the headrest is a comma type headrest. "Comma type headrest" is understood to mean a headrest having a profile allowing it, when the headrest is in the low position, to be recessed in a complementary shape cut out made in the upper ends 122, 222 of the first and second seatbacks 120, 220. Thus, in low position, the volume of the headrest is reduced and does not hinder the change in table position of the first and second seats 120, 220.

Alternatively, the headrest is mounted rotating relative to the first and second seatbacks 120, 220 around an axis substantially parallel to the transverse direction Y. Thus, the headrest can be folded down on the first and second seatbacks 120, 220 and not hinder the change of the seats 100, 200 into table position.

Finally, of course, the characteristics of the three implementation examples presented above can be combined and interchanged between the various implementation examples. For example, in the first implementation example, the second part 234 of the locking system 230 could be included in the floor and the first part 232 could be connected directly to a lower part of the fixed profile 262 of the second slider 260 as in the second implementation example.

The invention claimed is:

1. A set of seats for an automotive vehicle, where the set of seats comprises a first seat and a second seat, where the first seat is provided with a first seatback and a first seat bottom, where the second seat is provided with a second seatback and a second seat bottom with the second seat bottom extending between an anterior end and a posterior end, and where said second seat bottom is connected to the second seatback by the posterior end, in which the set of seats is configured in order to have:
   a road configuration in which the second seat is in a seated position in which the second seat bottom extends substantially horizontally and the second seatback extends substantially vertically in order to receive a user resting on the second seat bottom and the second seatback; and
   a relaxed configuration in which the second seat is in a table position in which the second seatback extends substantially horizontally and the second seat bottom extends substantially vertically, where the second seatback and the second seat bottom delimit a knee space placed opposite the first seat, such that the user can sit resting on the first seat bottom and the first seatback and place their knees in said knee space, the knee space being delimited by a triangle formed by the second seatback, the second seat bottom, and an imaginary line connecting an upper end of the second seatback and the anterior end of the second seat bottom.

2. The set of seats according to claim 1, wherein at least one among the first seat and the second seat is configured for making a reversibility operation for passing from the road configuration to the relaxed configuration, such that in the road configuration the first seatback and the second seatback are oriented in the same direction and in the relaxed configuration the first seat faces the knee space, where the second seat bottom and the first seatback are substantially face-to-face.

3. The set of seats according to claim 2, wherein the reversibility operation comprises a rotation around a substantially vertical axis of rotation, of at least one among the first seat and the second seat.

4. The set of seats according to claim 3, wherein the second seat is located in back relative to the first seat in the road configuration, the first seat is configured for rotating around the axis of rotation between the road configuration and the relaxed configuration, and the rotation around the axis of rotation has a rotational amplitude substantially equal to 180°.

5. The set of seats according to claim 3, wherein the second seat is located in front relative to the first seat in the road configuration, the second seat is configured for rotating around the axis of rotation between the road configuration and the relaxed configuration, and the rotation around the axis of rotation has a rotational amplitude substantially equal to 180°.

6. A set of seats for an automotive vehicle, where the set of seats comprises a first seat and a second seat, where the first seat is provided with a first seatback and a first seat bottom, where the second seat is provided with a second seatback and a second seat bottom, with the second seat bottom extending between an anterior end and a posterior end, and where said second seat bottom is connected to the second seatback by the posterior end, in which the second seat is configured for turning around a transverse tilting axis located near the anterior end of the second seat bottom, until the second seatback and the second seat bottom delimit a knee space placed opposite the first seat, such that a user can sit resting on the first seat bottom and the first seatback and place their knees in said knee space, the knee space being delimited by a triangle formed by the second seatback, the second seat bottom, and an imaginary line connecting an upper end of the second seatback and the anterior end of the second seat bottom.

7. The set of seats according to claim 1, wherein the second seat comprises a locking system, where the locking system comprises a first part connected to the second seat bottom near the posterior end and a second part intended to be connected to a floor, where the locking system is configured for having a released configuration in which the first part is free relative to the second part, and a locked configuration in which the first part is held relative to the second part.

8. The set of seats according to claim 1, wherein the set of seats further comprises at least one slider comprising a fixed profile and a mobile profile, where the mobile profile is mounted sliding relative to the fixed profile, in which the anterior end of the second seat bottom is mounted rotatably relative to the mobile profile of the at least one slider.

9. The set of seats according to claim 1, wherein the second seatback is mounted rotatably relative to the second seat bottom, where a hinge mechanism is provided for adjusting the inclination of the second seatback relative to the second seat bottom, and where an articulation mechanism allows keeping the second seatback relative to the second seat bottom in at least one from:
   at least one comfort inclination in which the second seatback forms relative to the second seat bottom a first angle included in a range of comfort inclinations, with the range of comfort inclinations extending between 90° and 170°, and
   at least one desk inclination in which the second seatback forms a second angle relative to the second seat bottom included in a range of desk inclinations, with the range of desk inclinations extending between 80° and 105°.

10. The set of seats according to claim 9, wherein the range of comfort inclinations extends between 100° and 150°, and the range of desk inclinations extends between 85° and 100°.

11. The set of seats according to claim 6, wherein the second seat comprises a locking system, where the locking system comprises a first part connected to the second seat bottom near the posterior end and a second part intended to be connected to a floor, where the locking system is configured for having a released configuration in which the first part is free relative to the second part, and a locked configuration in which the first part is held relative to the second part.

12. The set of seats according to claim 6, wherein the set of seats further comprises at least one slider comprising a fixed profile and a mobile profile, where the mobile profile is mounted sliding relative to the fixed profile, in which the anterior end of the second seat bottom is mounted rotatably relative to the mobile profile of the at least one slider.

13. The set of seats according to claim 6, wherein the second seatback is mounted rotatably relative to the second seat bottom, where a hinge mechanism is provided for adjusting the inclination of the second seatback relative to the second seat bottom, and where an articulation mechanism allows keeping the second seatback relative to the seat bottom in at least one from:
   at least one comfort inclination in which the second seatback forms relative to the second seat bottom a first angle included in a range of comfort inclinations, with the range of comfort inclinations extending between 90° and 170°, and
   at least one desk inclination in which the second seatback forms a second angle relative to the second seat bottom included in a range of desk inclinations, with the range of desk inclinations extending between 80° and 105°.

14. The set of seats according to claim 13, wherein the range of comfort inclinations extends between 100° and 150°, and the range of desk inclinations extends between 85° and 100°.

15. A vehicle comprising a set of seats according to claim 1.

16. A vehicle comprising a set of seats according to claim 6.

17. A method for arrangement of a set of seats for an automotive vehicle where the set of seats comprises a first seat and a second seat, where the first seat is provided with a first seatback and a first seat bottom, where the second seat is provided with a second seatback and a second seat bottom with the second seat bottom extending between an anterior end and a posterior end, and where said second seat bottom is connected to said second seatback by the posterior end, said method comprising a movement of the set of seats between:
   a road configuration in which the second seat is in a seated position in which the second seat bottom extends substantially horizontally and the second seatback extends substantially vertically in order to receive a user resting on the second seat bottom and the second seatback; and
   a relaxed configuration in which the second seat is in a table position in which the second seatback extends substantially horizontally and the second seat bottom extends substantially vertically, where the second seatback and the second seat bottom delimit a knee space placed opposite the first seat, such that the user can sit on the first seat and place their knees in said knee space, where said movement of the set of seats comprises a tilting of the second seat between the seated position and the table position, the knee space being delimited by a triangle formed by the second seatback, the second seat bottom, and an imaginary line connecting an upper end of the second seatback and the anterior end of the second seat bottom.

18. The method for arrangement of a set of seats according to claim 17, wherein the movement of the set of seats between the road configuration and the relaxed configuration further comprises a rotation of at least one among the first seat and the second seat around a substantially vertical axis, where the first seatback and the second seatback are oriented in the same direction in the road configuration and where the second seat bottom and the first seatback are substantially face-to-face in the relaxed configuration.

19. The method for arrangement of a set of seats according to claim 17, wherein the movement of the set of seats between the road configuration and the relaxed configuration further comprises bringing the second seat closer to the first seat.

* * * * *